US012728388B2

(12) United States Patent
Wang et al.

(10) Patent No.: US 12,728,388 B2
(45) Date of Patent: Sep. 8, 2026

(54) METHOD OF PREPARING REVERSE OSMOSIS MEMBRANE WITH CHARGED HYDROGEL AND POLYAMIDE DOUBLE NETWORK

(71) Applicant: Harbin Institute of Technology, Harbin City (CN)

(72) Inventors: Panpan Wang, Harbin (CN); Shiyi Qiu, Harbin (CN); Zhilin Zhang, Harbin (CN); Jun Ma, Harbin (CN); Mansheng Chen, Harbin (CN); Jiaying Yan, Harbin (CN)

(*) Notice: Subject to any disclaimer, the term of this patent is extended or adjusted under 35 U.S.C. 154(b) by 8 days.

(21) Appl. No.: 19/071,673

(22) Filed: Mar. 5, 2025

(65) Prior Publication Data

US 2025/0281880 A1 Sep. 11, 2025

(30) Foreign Application Priority Data

Mar. 5, 2024 (CN) ......................... 202410248846.0

(51) Int. Cl.
*B01D 61/08* (2006.01)
*B01D 61/02* (2006.01)
(Continued)

(52) U.S. Cl.
CPC ........... *B01D 61/025* (2013.01); *B01D 61/08* (2013.01); *B01D 65/02* (2013.01);
(Continued)

(58) Field of Classification Search
CPC ...... B01D 61/025; B01D 61/08; B01D 65/02; B01D 67/0002; B01D 69/02;
(Continued)

(56) References Cited

U.S. PATENT DOCUMENTS 4,814,082 A 3/1989 Wrasidlo
2020/0222860 A1 7/2020 Sadeghi et al.

FOREIGN PATENT DOCUMENTS

CN 102921314 A 2/2013
CN 107983175 A 5/2018
(Continued)

OTHER PUBLICATIONS

English translation copy of Chinese Patent Publication No. CN 115121126 A (2022).*
(Continued)

*Primary Examiner* — John Kim
(74) *Attorney, Agent, or Firm* — Novoclaims Patent Services LLC; Mei Lin Wong

(57) ABSTRACT

A method of preparing reverse osmosis membrane with double network of charged hydrogel and polyamide includes the steps of: (a) preparing an aqueous phase polymer solution containing m-phenylenediamine, polymer monomer with ionic group and crosslinking agent, and an organic phase polymer solution containing trimesoyl chloride and photoinitiator; (b) preparing a reverse osmosis membrane by inducing reaction of the aqueous phase and the organic phase polymer solution under ultraviolet light to form a charged hydrogel layer and a polyamide layer respectively; and (c) cleaning the membrane. The hydrogel layer not only enhances the electrical properties, thereby limiting the dissolution of ions in water on the membrane surface and the diffusion of ions in the membrane, and reducing the ions passing through the membrane, but also improves the hydrophilicity, which is beneficial to the transmission of water molecules within the membrane and the improvement of the anti-fouling performance of the membrane.

7 Claims, 2 Drawing Sheets

(51) Int. Cl.

| | |
|---|---|
| ***B01D 65/02*** | (2006.01) |
| ***B01D 67/00*** | (2006.01) |
| ***B01D 69/02*** | (2006.01) |
| ***B01D 69/12*** | (2006.01) |
| ***B01D 71/06*** | (2006.01) |
| ***B01D 71/56*** | (2006.01) |
| ***B01D 71/82*** | (2006.01) |
| ***C02F 1/44*** | (2023.01) |
| *C02F 103/08* | (2006.01) |

(52) U.S. Cl.

CPC ......... *B01D 67/0002* (2013.01); *B01D 69/02* (2013.01); *B01D 69/1214* (2022.08); *B01D 69/125* (2013.01); *B01D 69/1251* (2022.08); *B01D 71/06* (2013.01); *B01D 71/56* (2013.01); *B01D 71/82* (2013.01); *C02F 1/441* (2013.01); *B01D 2323/30* (2013.01); *B01D 2323/345* (2013.01); *B01D 2323/40* (2013.01); *B01D 2325/26* (2013.01); *B01D 2325/36* (2013.01); *B01D 2325/48* (2013.01); *B01D 2325/50* (2022.08); *C02F 2103/08* (2013.01); *Y02A 20/131* (2018.01)

(58) Field of Classification Search

CPC .............. B01D 69/1214; B01D 69/125; B01D 69/1251; B01D 71/06; B01D 71/56; B01D 71/82; B01D 2323/30; B01D 2323/345; B01D 2323/40; B01D 2325/26; B01D 2325/36; B01D 2325/48; B01D 2325/50; C02F 1/441; C02F 2103/08; Y02A 20/131

See application file for complete search history.

(56) References Cited

FOREIGN PATENT DOCUMENTS

| | | | |
|---|---|---|---|
| CN | 109621752 | A | 4/2019 |
| CN | 114177774 | A | 3/2022 |
| CN | 114247302 | A | 3/2022 |
| CN | 115121126 | A | 9/2022 |
| CN | 115672030 | A | 2/2023 |
| CN | 116550158 | A | 8/2023 |

OTHER PUBLICATIONS

English translation copy of Chinese Patent Publication No. CN 116550158 A (2023).*

* cited by examiner

METHOD OF PREPARING REVERSE OSMOSIS MEMBRANE WITH CHARGED HYDROGEL AND POLYAMIDE DOUBLE NETWORK

CROSS REFERENCE OF RELATED APPLICATION

This is a non-provisional application which claimed priority of Chinese application number 2024102488460, filing date Mar. 5, 2024. The contents of these specifications, including any intervening amendments thereto, are incorporated herein by reference.

BACKGROUND OF THE PRESENT INVENTION

Field of Invention

The present invention relates to a preparation method of reverse osmosis membrane.

Description of Related Arts

With the continuous growth of the world's population and the continuous development of the economy, the contradiction between water supply and demand has become increasingly prominent, and water shortage has become a global problem. Since desalination technology for seawater and brackish water is not affected by climate and can provide stable water supply in all weather, it has become an important way for countries around the world to cope with freshwater shortages. Studies on reverse osmosis membrane desalination technology began in the 1970s. After decades of development, it has become one of the main means of seawater desalination and brackish water desalination, accounting for about 65% of the global seawater desalination market share. Reverse osmosis desalination technology mainly uses external pressure higher than the osmotic pressure of seawater to allow water molecules to pass through the reverse osmosis membrane to obtain fresh water, which consumes a lot of energy. Therefore, how to improve the efficiency of reverse osmosis desalination and reduce the cost of freshwater production is the focus of the development of reverse osmosis desalination technology.

The reverse osmosis membrane achieves effective separation of ions and water molecules in water by constructing a non-porous membrane polyamide separation layer. Salt separation performance is an important indicator for measuring the filtration performance of reverse osmosis membranes, which is often controlled by the composition and structure of the polyamide functional layer. In order to build the best polyamide structure, researchers have made great efforts and summarized many rules. The rough surface of the polyamide membrane can increase the effective area of water transfer during the filtration process, thereby improving the water permeability of the reverse osmosis membrane. Hydrophilic materials, such as metal-organic frameworks, were introduced into the polyamide layer to facilitate the transport of water molecules and enhance the salt separation performance of the membrane. In addition, constructing an intermediate layer between the polyamide functional layer and the base membrane can also effectively improve the water permeability of the reverse osmosis membrane. At the same time, the issue of membrane fouling faced by reverse osmosis membranes during use also seriously restricts their application in the field of seawater desalination.

Existing methods for preparing reverse osmosis membranes often only focus on improving the salt separation performance of reverse osmosis membranes, or on anti-fouling modification of the polyamide structure of reverse osmosis membranes. Therefore, in order to improve the salt separation performance and anti-fouling performance of the reverse osmosis membrane, two or even more steps of reaction are usually required to construct the target performance of the membrane one by one. At the same time, reverse osmosis membranes are also confronted with the challenge of insufficient bonding strength between different structural and functional layers.

SUMMARY OF THE PRESENT INVENTION

An object of the present invention is to solve the problem that the reverse osmosis membrane prepared by the existing method has multiple-step reactions and insufficient bonding strength of different structural and functional layers, and to provide a method of preparing reverse osmosis membrane with double network of charged hydrogel and polyamide.

The present invention constructs a charged hydrogel polyamide double network layer on the membrane surface through an interface-initiated free radical polymerization reaction, and the electrical properties of the membrane are enhanced by the presence of the charged hydrogel, thereby limiting the dissolution of ions in water on the membrane surface and the diffusion of ions in the membrane, thereby reducing the number of ions passing through the membrane. At the same time, the hydrogel improves the hydrophilicity of the membrane, which is beneficial to the transmission of water molecules in the membrane and the improvement of the anti-fouling performance of the membrane.

A method of preparing reverse osmosis membrane with double network of charged hydrogel and polyamide includes the following specific steps:

(a) Preparation of Polymer Solution:

(a.1) add m-phenylenediamine, polymer monomer with ionic group and crosslinking agent into deionized water, then carry out magnetic stirring to obtain an aqueous solution of polymer solution (also referred to as: aqueous phase polymer solution), wherein the polymer monomer with ionic group are organic compounds with ionic groups and carbon-carbon double bonds, the crosslinking agent is an organic compound with two carbon-carbon double bonds, and in the aqueous solution of polymer solution, a mass fraction of m-phenylenediamine is 1.0%~10%, a mass fraction of the polymer monomer with ionic group is 0.001%~10%, and a mass fraction of the crosslinking agent is 0.001%~10%; and (a.2) add 1,3,5-benzenetricarboxylic acid chloride (also referred to as: trimesoyl chloride) and photoinitiator to an organic solvent and stirring evenly to obtain a polymer solution in organic phase (also referred to as: organic phase polymer solution), wherein in the polymer solution in organic phase, a mass fraction of the 1,3,5-benzenetricarboxylic acid chloride is 0.05%~0.5%, and a concentration of the photoinitiator is 0.001~0.1 g/mL.

(b) Preparation of a Reverse Osmosis Membrane:

(b.1) carry out cleaning of a membrane and fixing of the membrane after cleaning on a glass plate, pour deionized water on a membrane surface of the membrane for wetting, pour out the deionized water on the membrane surface after the membrane is wetted, and carry out blow drying of the membrane surface;

(b.2) pour the aqueous solution of polymer solution on the membrane surface for wetting, and pour out the aqueous solution of polymer solution on the membrane surface after the membrane is wetted, and remove residual droplets on the membrane surface; and (b.3) pour the polymer solution in organic phase onto the membrane surface and place the membrane under ultraviolet light to induce reaction to obtain a reverse osmosis membrane with double network of charged hydrogel and polyamide.

(c) Cleaning the Membrane:

wash the reverse osmosis membrane with double network of charged hydrogel and polyamide with deionized water and then store in deionized water.

The advantages of the present invention are as follows:

(1) The reverse osmosis membrane with charged hydrogel and polyamide double network prepared by the present invention has low requirements on the material of the base membrane and a wide range of applicable membrane modification.

(2). The charged groups of the reverse osmosis membrane with charged hydrogel and polyamide double network prepared by the present invention are widely and uniformly distributed, which is conducive to the efficient separation of salt and water.

(3) The process and equipment requirements of the present invention is simple, easy to operate, has a short process cycle, and has low requirements for the operating environment.

(4) The reverse osmosis membrane with charged hydrogel and polyamide double network prepared by the present invention has good salt and water separation performance. Compared with the traditional polyamide membrane, the water flux and salt selectivity are significantly improved.

(5) The reverse osmosis membrane with charged hydrogel and polyamide double network prepared by the present invention has good anti-fouling performance. In the fouling experiment, its water flux is significantly enhanced compared with the polyamide membrane.

DETAILED DESCRIPTION OF THE PREFERRED EMBODIMENT

Figure 1:
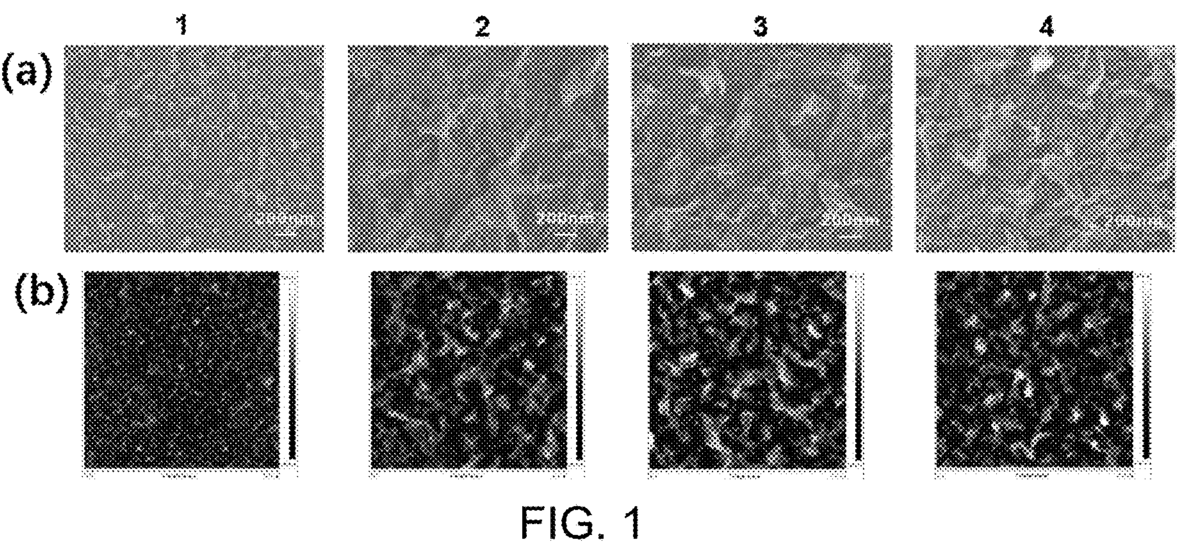
FIG. 1 is a scanning electron microscope surface image and surface roughness image of the reverse osmosis membrane prepared in Exemplary Embodiments 1, 2, 3, and 4, which are referred to as 1, 2, 3 and 4 respectively.

The present invention is further described in detail below in the preferred embodiments, but it should not be construed as limiting the present invention. Without departing from the essence of the present invention, the modifications and replacements made to the methods, steps or conditions of the present invention all belong to the scope of the present invention.

Preferred Embodiment 1

According to this embodiment, a method of preparing reverse osmosis membrane with double network of charged hydrogel and polyamide includes the following specific steps:

(a) Preparation of Polymer Solution:

Step (a.1): Add m-phenylenediamine, polymer monomer with ionic group and crosslinking agent into deionized water, then carry out magnetic stirring to obtain an aqueous solution of polymer solution (i.e. the aqueous phase polymer solution).

In step (a.1), the polymer monomer with ionic group are organic compounds with ionic groups and carbon-carbon double bonds.

In step (a.1), the crosslinking agent is an organic compound with two carbon-carbon double bonds.

In step (a.1), in the aqueous solution of polymer solution, a mass fraction of m-phenylenediamine is 1.0% 10%, a mass fraction of the polymer monomer with ionic group is 0.001%~10%, and a mass fraction of the crosslinking agent is 0.001%~10%.

Step (a.2): Add 1,3,5-benzenetricarboxylic acid chloride (also referred to as: trimesoyl chloride) and photoinitiator to an organic solvent and stir evenly to obtain a polymer solution in organic phase (i.e., organic phase polymer solution).

In step (a.2), in the polymer solution in organic phase, a mass fraction of the 1,3,5-benzenetricarboxylic acid chloride is 0.05%~0.5%, and a concentration of the photoinitiator is 0.001~0.1 g/mL.

(b) Preparation of a Reverse Osmosis Membrane:

Step (b.1): Carry out cleaning of a membrane, fixing the membrane after cleaning on a glass plate, pour deionized water on a membrane surface of the membrane for wetting, pour out the deionized water on the membrane surface of the membrane after the membrane is wetted, and carry out blow drying of the membrane surface;

Step (b.2): Pour the aqueous solution of polymer solution on the membrane surface for wetting, and pour out the aqueous solution of polymer solution on the membrane surface of the membrane after the membrane is wet, and remove residual droplets on the membrane surface of the membrane; and Step (b.3): Pour the polymer solution in organic phase onto the membrane surface of the membrane and place the membrane under ultraviolet light to allow reaction, then obtain a reverse osmosis membrane with double network of charged hydrogel and polyamide.

(c) Cleaning the Membrane:

Wash the reverse osmosis membrane with double network of charged hydrogel and polyamide with deionized water and then store in deionized water.

Preferred Embodiment 2

The difference between this embodiment and the Preferred Embodiment 1 is that: in step (a.1), the polymer monomer with ionic group is selected from the group consisting one or more of 3-sulfopropyl methacrylate potassium salt, methacryloyloxyethyl trimethyl ammonium chloride solution, [2-(methacryloyloxy)ethyl]dimethyl-(3-sulfopropyl) ammonium hydroxide, 2-methacryloyloxyethyl phosphorylcholine, carboxybetaine methacrylate, and carboxybetaine acrylamide. Other steps are the same as in the Preferred Embodiment 1.

Preferred Embodiment 3

The difference between this embodiment and the preferred embodiment 1 or 2 is that: in step (a.1), the crosslinking agent is selected from the group consisting one or more of polyethylene glycol diacrylate, N,N-methylenebis (acrylamide) and N,N-dimethylacryloylcystine, and the magnetic stirring refers to carrying out magnetic stirring at 300 r/min for 0.1~6 h. Other steps are the same as in the preferred embodiment 1 or 2.

Preferred Embodiment 4

The difference between this embodiment and any one of the preferred embodiments 1-3 is that: in step (a.2), the organic solvent is selected from the group consisting one or more of Isopar-G, benzene, xylene, n-hexane and cyclohexane. Other steps are the same as in the preferred embodiments 1-3.

Preferred Embodiment 5

The difference between this embodiment and any one of the preferred embodiments 1-4 is that: the photoinitiator is selected from the group consisting of 1-hydroxycyclohexyl phenyl ketone, 2-hydroxy-2-methyl-1-phenylpropanone, 2-hydroxy-2-methyl-1-[4-(2-hydroxyethoxy)phenyl]-1-propanone and diphenylacetone. Other steps are the same as in the preferred embodiments 1-4.

Preferred Embodiment 6

The difference between this embodiment and any one of the preferred embodiments 1-5 is that: in step (b.1), the. membrane is selected from the group consisting of polysulfone membrane, polyethersulfone membrane, polyvinyl chloride membrane and polyvinylidene fluoride membrane. Other steps are the same as in the preferred embodiments 1-5.

Preferred Embodiment 7

The difference between this embodiment and any one of the preferred embodiments 1-6 is that: in step (b.1), the cleaning of the membrane comprises the steps of: soaking the membrane in isopropanol for 5 h~6 h, then rinsing with deionized water for 3~5 times and storing the membrane in deionized water; and in step (b.2), the term 'wetting' refers to as: after a liquid is poured onto the membrane surface, standing for 1 min~10 min so that the liquid enters the membrane pores through capillary action. Other steps are the same as in the preferred embodiments 1-6.

Preferred Embodiment 8

The difference between this embodiment and any one of the preferred embodiments 1-7 is that: in step (b.1), the fixing of the membrane comprises the steps of: providing a hollow polytetrafluoroethylene plate having a thickness of 1 cm, clamping the membrane on a glass plate along four sides by long tail clips, adding a hollow rubber pad between the membrane and the plate to prevent leakage of the polymer solution; wherein a middle hollow area is a membrane modification area, and the thickness of the plate is used to accommodate the aqueous solution of polymer solution and the polymer solution in organic phase; and in step (b.1), the blow drying of the membrane surface comprises the steps of: spraying nitrogen from an air gun to dry the water on the membrane surface so that the deionized water is only retained inside the membrane pores to prevent the aqueous phase polymer solution from penetrating deeply into the membrane pores. Other steps are the same as in the preferred embodiments 1-7.

Preferred Embodiment 9

The difference between this embodiment and any one of the preferred embodiments 1-8 is that: the step of removing residual droplets on the membrane surface comprises the steps of: using an air gun to spray nitrogen to gently blow off residual droplets on the membrane surface so that only an ultra-thin liquid layer adsorbed on the membrane surface is left. Other steps are the same as in the preferred embodiments 1-8.

Preferred Embodiment 10

The difference between this embodiment and any one of the preferred embodiments 1-9 is that: in step (b.3), the reaction under the ultraviolet lamp is referred to as: after the ultraviolet light runs 10 minutes and reach a stable state, placing the membrane under the ultraviolet light for a reaction time of 1 min~10 min to form a hydrogel layer and a polyamide layer simultaneously, wherein the photoinitiator in the organic phase is induced to generate free radicals and the free radicals induce a polymerization reaction of the polymer monomer with ionic groups and the crosslinking agent at an interface of the organic phase and the aqueous phase to form the hydrogel layer; and phenylenediamine and trimesoyl chloride are polymerized to form the polyamide layer. Other steps are the same as in the preferred embodiment 1-9.

The present invention will be described in detail below in conjunction with the following exemplary embodiments and the beneficial effects of the present invention are verified through the following exemplary embodiments.

Exemplary Embodiment 1

A method of preparing polyamide membrane includes the following specific steps:

(a) Preparation of Polymer Solution:

Step (a.1): Add m-phenylenediamine, polymer monomer with ionic group and crosslinking agent into deionized water, then carry out magnetic stirring at 300 r/min for 6 hours to obtain an aqueous phase polymer solution.

In step (a.1), the polymer monomer with ionic group refers to 3-sulfopropyl methacrylate potassium salt.

In step (a.1), the crosslinking agent refers to polyethylene glycol diacrylate.

In step (a.1), in the aqueous phase polymer solution, a mass fraction of m-phenylenediamine is 2%, a mass fraction of the polymer monomer with ionic group is 0.0%, and a mass fraction of the crosslinking agent is 0.0%. (In other words, no polymer monomer with ionic group is added in step (a.1) and no crosslinking agent is added in step (a.1).)

Step (a.2): Add trimesoyl chloride and photoinitiator to an organic solvent and stir evenly to obtain an organic phase polymer solution.

In step (a.2), the organic solvent refers to isopar-G.

In step (a.2), the photoinitiator refers to 1-hydroxycyclohexyl phenyl ketone.

In step (a.2), in the organic phase polymer solution, a mass fraction of the trimesoyl chloride is 0.1%, and a concentration of the photoinitiator is 0.00 g/mL. (In other words, no photoinitiator is added in step (a.2).)

(b) Preparation of a Reverse Osmosis Membrane:

Step (b.1): Carry out cleaning of a membrane and fixing of the membrane after cleaning on a glass plate, pour deionized water on a membrane surface of the membrane for wetting, pour out the deionized water on the membrane surface after the membrane is wetted, and carry out blow drying of the membrane surface.

In step (b.1), the cleaning of the membrane includes the following steps: soak the membrane in isopropanol for 6 hours, then rinse with deionized water for 3 times and then store the membrane in deionized water.

In step (b.1), the term 'wetting' refers to as: pour a liquid onto the membrane surface and let it stand, wait for the liquid to contact for 2 minutes which allows the liquid to enter membrane pores through capillary action.

In step (b.1), the membrane is a polyethersulfone ultrafiltration membrane with a molecular weight cutoff of 20 k Daltons.

In step (b.1) fixing refers to: use a 1 cm thick hollow polytetrafluoroethylene plate to clamp the membrane on the glass plate along the four sides with long tail clips, and add a hollow rubber pad between the membrane and the plate to prevent the polymer solution from leaking; the middle hollow area is the membrane modification area, and the plate thickness can be used to accommodate the aqueous phase polymer solution and the organic phase polymer solution.

In step (b.1), blow drying of the membrane surface refers to: spray nitrogen by using an air gun to dry the water on the membrane surface, leave only some deionized water inside membrane pores to prevent the aqueous phase polymer solution from penetrating deeply into the membrane pores.

Step (b.2): Pour the aqueous phase polymer solution on the membrane surface of the membrane for wetting, and pour out the aqueous phase polymer solution on the membrane surface after the membrane is wet, and remove residual droplets on the membrane surface.

In step (b.2), removing residual droplets on the membrane surface includes the following steps: spray nitrogen by using an air gun to gently blow off the residual droplets on the membrane surface, then only an ultra-thin liquid layer adsorbed on the membrane surface is left. (That is, only a liquid layer adsorbed on the membrane surface is left on the membrane surface.)

Step (b.3): Pour the organic phase polymer solution onto the membrane surface and place the membrane under ultraviolet light to allow reaction, then obtain the polyamide membrane.

In step (b.3), after the UV light runs for 10 minutes to reach a stable operation state, the membrane is placed under the UV light for a reaction time of 2 minutes.

(c) Cleaning the Membrane:

Wash the polyamide membrane with deionized water three times and then store the polyamide membrane in deionized water.

Exemplary Embodiment 2

A method of preparing reverse osmosis membrane with double network of charged hydrogel and polyamide includes the following specific steps:

(a) Preparation of Polymer Solution:

Step (a.1): Add m-phenylenediamine, polymer monomer with ionic group and crosslinking agent into deionized water, then carry out magnetic stirring at 300 r/min for 6 hours to obtain an aqueous phase polymer solution (i.e., an aqueous solution of polymer solution).

In step (a.1), the polymer monomer with ionic group refers to 3-sulfopropyl methacrylate potassium salt.

In step (a.1), the crosslinking agent refers to polyethylene glycol diacrylate.

In step (a.1), in the aqueous phase polymer solution, a mass fraction of m-phenylenediamine is 2%, a mass fraction of the polymer monomer with ionic group is 0.2%, and a mass fraction of the crosslinking agent is 0.2%.

Step (a.2): Add trimesoyl chloride and photoinitiator to an organic solvent and stir evenly to obtain an organic phase polymer solution (i.e., a polymer solution in organic phase).

In step (a.2), the organic solvent is Isopar-G.

In step (a.2), the photoinitiator is 1-hydroxycyclohexyl phenyl ketone.

In step (a.2), in the organic phase polymer solution, a mass fraction of the trimesoyl chloride is 0.1%, and a concentration of the photoinitiator is 0.01 g/mL.

(b) Preparation of a Reverse Osmosis Membrane:

Step (b.1): Carry out cleaning of a membrane and fixing of the membrane after cleaning on a glass plate, pour deionized water on the membrane surface of the membrane for wetting, pour out the deionized water on the membrane surface after the membrane is wetted, and carry out blow drying of the membrane surface.

In step (b.1), the cleaning of the membrane includes the following steps: immerse the membrane in isopropanol for 6 hours, then rinse with deionized water for 3 times and then store the membrane in deionized water.

In step (b.1), the process of wetting includes the following steps: pour a liquid onto the membrane surface and let it stand, wait for the liquid to contact for 2 minutes to allow the liquid to enter the membrane pores through capillary action.

In step (b.1), the membrane refers to a polyethersulfone ultrafiltration membrane with a molecular weight cutoff of 20 k Daltons.

In step (b.1) the process of fixing includes the following steps: use a 1 cm thick hollow polytetrafluoroethylene plate to clamp the membrane on the glass plate along the four sides with long tail clips, and add a hollow rubber pad between the membrane and the plate to prevent the polymer solution from leaking; the middle hollow area is the membrane modification area, and the plate thickness can be used to accommodate the aqueous phase polymer solution and the organic phase polymer solution.

In step (b.1), blow drying of the membrane surface includes the following steps: spray nitrogen by using an air gun to dry the water on the membrane surface so that only the deionized water inside the membrane pores if left and the aqueous phase polymer solution is prevented from penetrating deeply into the membrane pores.

Step (b.2): Pour the aqueous phase polymer solution on the membrane surface of the membrane for wetting, and pour out the aqueous phase polymer solution on the membrane surface after the membrane is wet, and remove residual droplets on the membrane surface.

In step (b.2), removing residual droplets on the membrane surface includes the following steps: spray nitrogen by using an air gun to gently blow off the residual droplets on the membrane surface so that only an ultra-thin liquid layer adsorbed on the membrane surface is left. That is to say, only a liquid layer absorbed on the membrane surface is left.

Step (b.3): Pour the organic phase polymer solution onto the membrane surface of the membrane and place the membrane under ultraviolet light to allow reaction, then obtain the reverse osmosis membrane with double network of charged hydrogel and polyamide.

In step (b.3), after the UV light runs for 10 minutes to reach a stable operation state, the membrane is placed under the UV light for reaction. The photoinitiator in the organic phase generates free radicals, which trigger the polymerization reaction of the ionic group polymer monomer and the crosslinker at the interface of the organic phase and the aqueous phase to form a hydrogel layer. At the same time, m-phenylenediamine and trimesoyl chloride polymerize to form a polyamide layer. The reaction time under ultraviolet light is 2 minutes.

(c) Cleaning the Membrane:

Wash the reverse osmosis membrane with double network of charged hydrogel and polyamide with deionized water three times and then store in deionized water.

Exemplary Embodiment 3

The difference between this embodiment and Exemplary Embodiment 2 is that: in step (a.1), in the aqueous phase polymer solution, a mass fraction of m-phenylenediamine is 2%, a mass fraction of the polymer monomer with ionic group is 0.8%, and a mass fraction of the crosslinking agent is 0.2%. Other steps and parameters are the same as those in Exemplary Embodiment 2.

Exemplary Embodiment 4

The difference between this embodiment and Exemplary Embodiment 2 is that: in step (a.1), in the aqueous phase polymer solution, a mass fraction of m-phenylenediamine is 2%, a mass fraction of the polymer monomer with ionic group is 1.6%, and a mass fraction of the crosslinking agent is 0.2%. Other steps and parameters are the same as those in Exemplary Embodiment 2.

FIG. 1 is a scanning electron microscope surface image and surface roughness image of the reverse osmosis membrane prepared in Exemplary Embodiments 1, 2, 3, and 4. As shown in FIG. 1, the charged hydrogel and polyamide double-network layer grows continuously on the surface of the polyethersulfone membrane in Exemplary Embodiments 2, 3, and 4.

The gel layer surfaces corresponding to Exemplary Embodiments 2, 3, and 4 are all node-shaped and have leaf-like structures. The surface of Exemplary Embodiment 1 only has node-shaped structure. The surface roughness of Exemplary Embodiments 1, 2, 3, and 4 are 26.2 nm, 47.6 nm, 50.8 nm, and 56.5 nm respectively. This indicates that as the content of charged hydrogel increases, the roughness of the hydrogel on the membrane surface increases; and the large surface roughness gives the membrane a larger water flow area, which is beneficial to the membrane water production.

Figure 2:
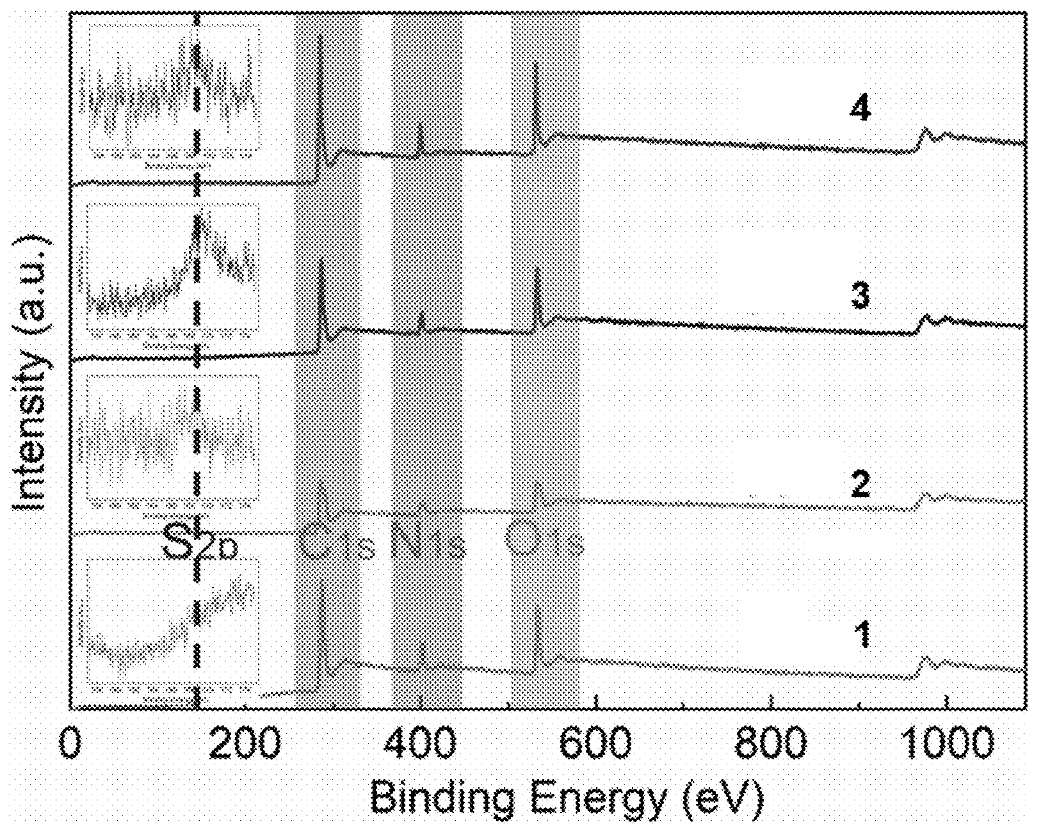
FIG. 2 illustrates the XPS full spectrum of the reverse osmosis membrane prepared in Exemplary Embodiments 1, 2, 3, and 4, which are referred to as 1, 2, 3 and 4 respectively.

FIG. 2 illustrates the XPS full spectrum of the reverse osmosis membrane prepared in Exemplary Embodiments 1, 2, 3, and 4. As shown in FIG. 2, the charged hydrogel and polyamide double-network layer is continuously coated on the surface of the polyethersulfone membrane in Exemplary Embodiments 2, 3, and 4. The N element representing the polyamide network appeared on its surface, and the introduction of the polymer monomer with ionic groups caused the S element to appear on the membrane surface, which confirmed the formation of the charged hydrogel network structure.

Figure 3:
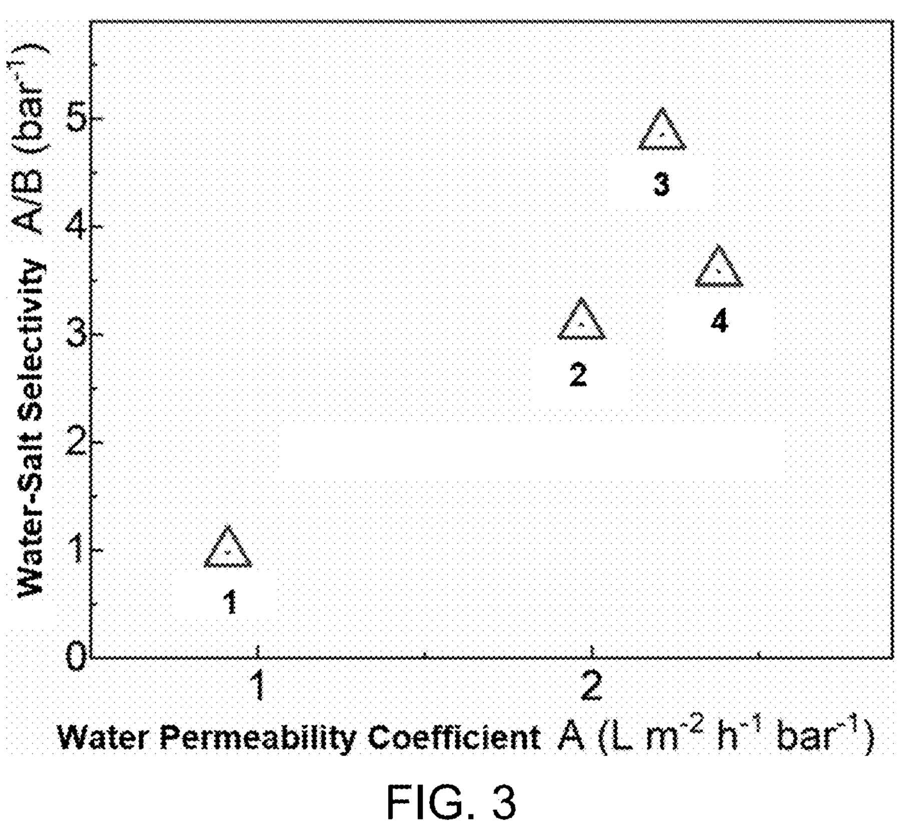
FIG. 3 illustrates the changing trends in flux and selectivity of the reverse osmosis membrane prepared in Exemplary Embodiments 1, 2, 3, and 4, which are referred to as 1, 2, 3 and 4 respectively.

The water production performance and anti-fouling performance of the membrane are evaluated using a membrane filtration device based on the nanofiltration reverse osmosis cup produced by STERLITECH, USA. The membrane desalination performance is tested by using NaCl solution (the concentration of NaCl solution was 2 g/L) as the mother solution, as shown in FIG. 3. The membrane anti-fouling performance is tested by using a NaCl and humic acid composite solution (the concentrations of NaCl and humic acid in the NaCl and humic acid composite solution are 2 g/L and 300 mg/L respectively) as the mother solution, as shown in FIG. 4.

FIG. 3 illustrates the changing trends in flux and selectivity of the reverse osmosis membrane prepared in Exemplary Embodiments 1, 2, 3, and 4.

As shown in FIG. 3, as the hydrogel content increases, the water permeability coefficient of the membrane gradually increases, and the water production efficiency of the membrane gradually increases. At the same time, the introduction of charged hydrogel significantly improved the water-salt selectivity of the membrane, thereby improving the separation efficiency of salt and water.

Figure 4:
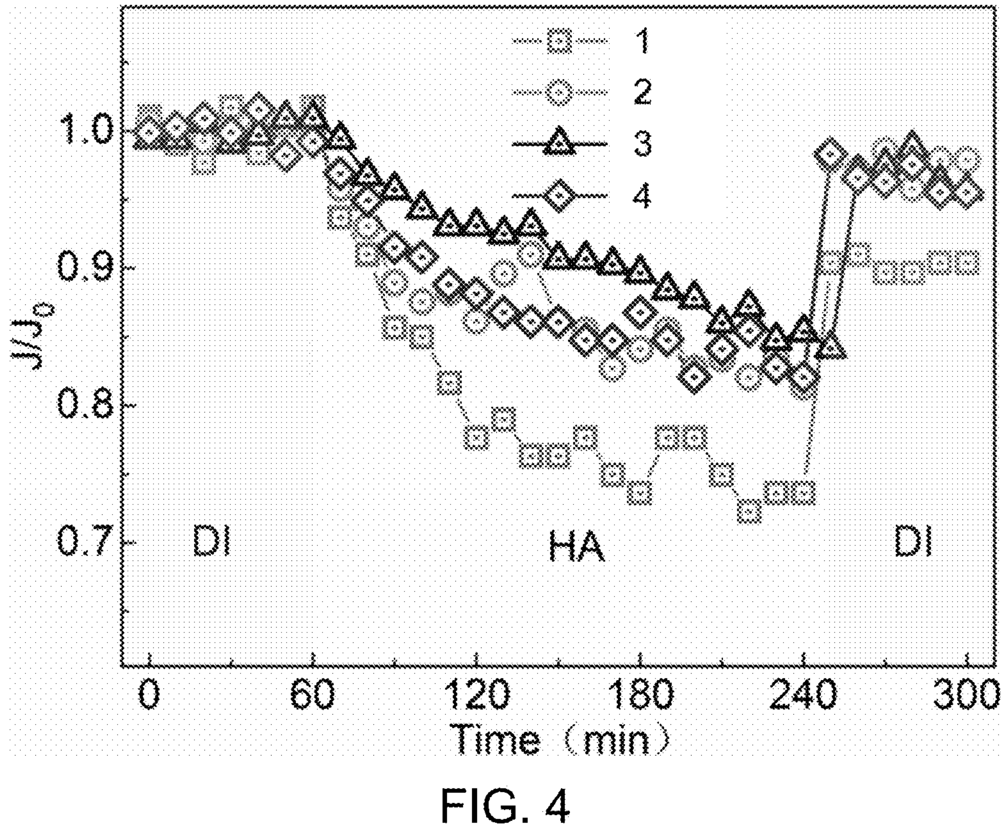
FIG. 4 illustrates the flux variation trend during reverse osmosis membrane fouling of the reverse osmosis membrane prepared in Exemplary Embodiments 1, 2, 3, and 4, which are referred to as 1, 2, 3 and 4 respectively.

FIG. 4 illustrates the flux variation trend during reverse osmosis membrane fouling of the reverse osmosis membrane prepared in Exemplary Embodiments 1, 2, 3, and 4.

As shown in FIG. 4, after 3 hours of humic acid solution filtration, the flux of the polyamide membrane prepared in Exemplary Embodiment 1 and the reverse osmosis membrane with double network of charged hydrogel and polyamide prepared in Exemplary Embodiments 2, 3, and 4 is reduced to 75%, 82%, 87%, and 85% of the initial membrane flux, respectively.

After simple rinsing with deionized water, the flux of the polyamide membrane prepared in Exemplary Embodiment 1 and the reverse osmosis membrane with double network of charged hydrogel and polyamide prepared in Exemplary Embodiments 2, 3, and 4 is restored to 90%, 97%, 98%, and 97% of the initial membrane flux, respectively. Compared with the polyamide membrane prepared in Exemplary Embodiment 1, the anti-fouling performance of the reverse osmosis membrane with double network of charged hydrogel and polyamide is significantly improved.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A method of preparing reverse osmosis membrane with double network of charged hydrogel and polyamide, characterized in that, said method comprising the steps of:

(a) preparing a polymer solution, which comprises the steps of:

(a.1) adding m-phenylenediamine, polymer monomer with ionic group and crosslinking agent into deionized water, carrying out magnetic stirring to obtain an aqueous solution of polymer solution, wherein the polymer monomer with ionic group are organic compounds with ionic groups and carbon-carbon double bonds, the polymer monomer with ionic group is selected from the group consisting one or more of 3-sulfopropyl methacrylate potassium salt, methacryloyloxyethyl trimethyl ammonium chloride solution, [2-(methacryloyloxy)ethyl]dimethyl-(3-sulfopropyl) ammonium hydroxide, 2-methacryloyloxy phosphorylcholine, carboxybetaine methacrylate, and carboxybetaine acrylamide, the crosslinking agent is an organic compound with two carbon-carbon double bonds, and the crosslinking agent is selected from the group consisting one or more of polyethylene glycol diacrylate, N,N-methylenebis(acrylamide) and N,N-dimethylacryloylcystine, and in the aqueous solution of polymer solution, a mass fraction of m-phenylenediamine is 1.0%~10%, a mass fraction of the polymer monomer with ionic group is 0.001%~10%, and a mass fraction of the crosslinking agent is 0.001%~10%; and (a.2) adding trimesoyl chloride and photoinitiator to an organic solvent and stirring evenly to obtain a polymer solution in organic phase, wherein in the polymer solution in organic phase, a mass fraction of the trimesoyl chloride is 0.05%~0.5%, and a concentration of the photoinitiator is 0.001~0.1 g/mL, the organic solvent is selected from the group consisting one or more of isopar-G, benzene, xylene, n-hexane and cyclohexane, the photoinitiator is selected from the group consisting of 1-hydroxycyclohexyl phenyl ketone, 2-hydroxy-2-methyl-1-phenylpropanone, 2-hydroxy-2-methyl-1-[4-(2-hydroxyethoxy)phenyl]-1-propanone and diphenylacetone;

(b) preparing a reverse osmosis membrane, which comprises the steps of:

(b.1) carrying out cleaning of a membrane and fixing of the membrane after cleaning on a glass plate, pouring deionized water on a membrane surface of the membrane for wetting, pouring out the deionized water on the membrane surface after the membrane is wetted, and carrying out blow drying of the membrane surface;

(b.2) pouring the aqueous solution of polymer solution on the membrane surface for wetting, and pouring out the aqueous solution of polymer solution on the membrane surface after the membrane is wet, and removing residual droplets on the membrane surface; and (b.3) pouring the polymer solution in organic phase onto the membrane surface and placing the membrane under ultraviolet light to carry out reaction to obtain a reverse osmosis membrane with double network of charged hydrogel and polyamide; and (c) cleaning the membrane, which comprises the steps of: washing the reverse osmosis membrane with double network of charged hydrogel and polyamide with deionized water and then storing the reverse osmosis membrane with double network of charged hydrogel and polyamide in deionized water.

2. The method of preparing reverse osmosis membrane with double network of charged hydrogel and polyamide according to claim 1, characterized in that, in step (a.1), the magnetic stirring refers to carrying out magnetic stirring at 300 r/min for 0.1~6 h.

3. The method of preparing reverse osmosis membrane with double network of charged hydrogel and polyamide according to claim 1, characterized in that, in step (b.1), the membrane is selected from the group consisting of polysulfone membrane, polyethersulfone membrane, polyvinyl chloride membrane and polyvinylidene fluoride membrane.

4. The method of preparing reverse osmosis membrane with double network of charged hydrogel and polyamide according to claim 1, characterized in that, in step (b.1), the cleaning of the membrane comprises the steps of: soaking the membrane in isopropanol for 5 hour~6 hour, then rinsing with deionized water for 3~5 times and storing the membrane in deionized water; and in step (b.2), wetting refers to: pouring a liquid onto the membrane surface, standing for 1 min~10 min to allow the liquid to enter membrane pores through capillary action.

5. The method of preparing reverse osmosis membrane with double network of charged hydrogel and polyamide according to claim 1, characterized in that, in step (b.1), the fixing of the membrane comprises the steps of: providing a hollow polytetrafluoroethylene plate having a thickness of 1 cm, clamping the membrane on a glass plate along four sides by long tail clips, adding a hollow rubber pad between the membrane and the plate to prevent leakage of the polymer solution; wherein a middle hollow area is a membrane modification area, and the thickness of the plate is used to accommodate the aqueous solution of polymer solution and the polymer solution in organic phase;

in step (b.1), the blow drying of the membrane surface comprises the steps of: spraying nitrogen from an air gun to dry the water on the membrane surface so that parts of the deionized water is only retained inside the membrane pores to prevent the aqueous phase polymer solution from penetrating deeply into the membrane pores.

6. The method of preparing reverse osmosis membrane with double network of charged hydrogel and polyamide according to claim 1, characterized in that, in step (b.2), the step of removing residual droplets on the membrane surface comprises the steps of: spraying nitrogen using an air gun to gently blow off the residual droplets on the membrane surface so that only an ultra-thin liquid layer adsorbed on the membrane surface is left.

7. The method of preparing reverse osmosis membrane with double network of charged hydrogel and polyamide according to claim 1, characterized in that, in step (b.3), the reaction under the ultraviolet light is carried out through the steps of: after the ultraviolet light runs 10 minutes and reach a stable state, placing the membrane under the ultraviolet light for a reaction time of 1 min~10 min to form a hydrogel layer and a polyamide layer simultaneously, wherein the photoinitiator in the organic phase is induced to generate free radicals and the free radicals induce a polymerization reaction of the polymer monomer with ionic groups and the crosslinking agent at an interface of the organic phase and the aqueous phase to form the hydrogel layer; and phenylenediamine and trimesoyl chloride are polymerized to form the polyamide layer.

* * * * *